(12) United States Patent
Daly

(10) Patent No.: US 6,748,021 B1
(45) Date of Patent: Jun. 8, 2004

(54) CELLULAR RADIO COMMUNICATIONS SYSTEM

(75) Inventor: Neil Daly, York (GB)

(73) Assignee: Nortel Networks Limited, St. Laurent (CA)

( * ) Notice: Subject to any disclaimer, the term of this patent is extended or adjusted under 35 U.S.C. 154(b) by 741 days.

(21) Appl. No.: 09/599,277

(22) Filed: Jun. 22, 2000

(51) Int. Cl.[7] .............................................. H04L 23/02
(52) U.S. Cl. .......................... 375/261; 370/337; 455/69; 455/93
(58) Field of Search ......................... 370/337; 455/69; 375/259, 302, 261; 330/149

(56) References Cited

U.S. PATENT DOCUMENTS

| | | | | |
|---|---|---|---|---|
| 5,049,832 A | * | 9/1991 | Cavers ....................... | 330/149 |
| 5,175,871 A | * | 12/1992 | Kunkel ........................ | 455/69 |
| 5,491,832 A | * | 2/1996 | Malkamaki et al. ..... | 455/552.1 |
| 5,909,469 A | * | 6/1999 | Frodigh et al. ............. | 375/302 |
| 5,940,439 A | | 8/1999 | Kleider et al. .............. | 375/225 |
| 6,122,293 A | * | 9/2000 | Frodigh et al. ............. | 370/473 |
| 6,125,148 A | * | 9/2000 | Frodigh et al. ............. | 375/261 |
| 6,134,230 A | * | 10/2000 | Olofsson et al. ........... | 370/337 |
| 6,163,766 A | * | 12/2000 | Kleider et al. .............. | 704/229 |
| 6,167,031 A | * | 12/2000 | Olofsson et al. ........... | 370/252 |
| 6,263,017 B1 | * | 7/2001 | Miller ........................ | 375/222 |
| 6,377,784 B2 | * | 4/2002 | McCune ...................... | 455/108 |
| 6,470,055 B1 | * | 10/2002 | Feher .......................... | 375/259 |

OTHER PUBLICATIONS

Sampei, S et al.; Adaptive Modulation/TDMA Scheme for Personal Multi–Media Communications Systems; 1994; IEEE; Global Telecommunications Conference; pp. 989–993.*

Matsuoka, H et al.; Adaptive Modulation System with Variable Coding Rate Concatenated Code for High Quality Multi–Media Communications System; Apr. 1996; IEEE; Vehicular Technology Conference; pp. 487–491.*

Naijoh, M et al.; ARQ Schemes with Adaptive Modulation/TDMA/TDD Systems for Wireless Multimedia Communications Services; Sep. 1997; IEEE; 8th IEEE International Symposium; pp. 709–713.*

Papers regarding the Ensemble Adaptive IP System for LMDS.

* cited by examiner

Primary Examiner—Stephen Chin
Assistant Examiner—Sudhanshu C. Pathak
(74) Attorney, Agent, or Firm—Barnes & Thornburg LLP

(57) ABSTRACT

A cellular radio communication system is provided for transmitting data over a plurality of transmission links. The system includes means for generating a modulated signal by applying a constant amplitude envelope modulation scheme to data to be transmitted across poor quality transmission links and amplifier means for non-linearly amplifying the modulated signal. The system can additionally include means for generating a second modulated signal by applying an amplitude dependent modulation scheme to data to be transmitted across higher quality transmission links and amplifier means for linearly amplifying the second modulated signal. Using a constant amplitude envelope modulation scheme, such as GMSK or MLCAM for poorer quality links means that for these links signals can be amplifier non-linearly at higher gains.

27 Claims, 13 Drawing Sheets

CELLULAR RADIO COMMUNICATIONS SYSTEM

FIELD OF INVENTION

The present invention relates to a cellular radio communication system. In particular the present invention relates to a broadband wireless access system suitable for the delivery of multi-media services.

BACKGROUND OF INVENTION

There is a growing demand for broadband wireless access systems which can deliver the high data rates required for the provision of multi-media services. Such wireless access systems operate within licensed frequency bands. Accordingly, these systems are continually developing to carry more data across the limited frequency band allocated to them. Pressure for this development is two fold. Firstly, there is increased demand for multi-media services from subscribers to the system. Secondly, revenue for the network operator will increase as billing is calculated on a per byte of information delivered basis as opposed to on a per second basis.

The performance of wireless access communication systems is prone to dynamic degradation, ie. time variant degradation, due to changing environmental conditions. Wireless transmissions in the frequency range from 10 to 50 GHz are particularly prone to dynamic degradation resulting from rain and from the growth and movement of foliage located in the transmission path. For example, radio wave propagation through rain causes absorption and scattering of the radio energy. These effects cause signal attenuation and must be considered in the design of radio communications systems, particularly at frequencies above several GHz, as the attenuation effects increase with frequency. FIG. 1 shows the attenuation of a 30 GHz signal in dB per kilometer due to rainfall against the percentage of time that such rainfall occurs within climate zone 'F' which zone covers the UK.

This type of dynamic degradation has been taken account of in existing wireless access systems by designing the systems for operation in worst case environmental conditions. This has been achieved by the use of robust modulation schemes such as QPSK (Quadrature Phase Shift Keying), also known as 4-QAM (Quadrature Amplitude Modulation) which deliver low BERs (bit error rates) of the order of $10^{-9}$, ie. one incorrect bit per $10^9$ bits transmitted, in poor environmental conditions. However, designing such systems for worst case environmental conditions in this way results in low rates of data transmission.

Amplitude dependent modulation schemes, such as 64-QAM, 16-QAM and QPSK in which the amplitude of the modulation envelope is varied according to the symbol to be transmitted (referred to hereafter as amplitude dependent modulation schemes) are considered to be the most spectrally efficient modulation schemes. These modulation techniques have therefore been preferred in radio communication systems such as mobile, satellite and fixed networks where the available bandwidth is limited. When using amplitude dependent modulation schemes, linear amplification is required in order to keep third order intermodulation products and spectral regrowth to within acceptable limits. Thus, some of the potential gain available from amplification has to be sacrificed.

As can be seen from FIG. 1, for the majority of time transmission conditions are good. Adaptive modulation techniques have been proposed which enable higher data rates to be achieved by the use of 16-QAM or 64-QAM modulation schemes when the transmission conditions across a wireless link are improved or where the distance over which the link extends is relatively short. In this way the rate of data transmission within a limited frequency band can be improved. However, for very poor transmission conditions or for transmissions over longer distances a break in communication can occur. This is because for amplitude dependent modulation schemes, the modulated signal has to undergo substantially linear amplification before transmission, as discussed above. This limits the output power of the amplifier, thus limiting the power of the signal that can be transmitted over the transmission link.

In known cellular wireless access system a frequency plan is implemented over a geographical area. The frequency plan allocates channels within the frequency band to localised cells and due to attenuation of a radio signal across the cells, the same channel can be re-used within other cells in the frequency plan. The aim is to maximise frequency re-use without causing interference between parts of the frequency plan which use the same channels. Generally, a base station is associated with a cell to transmit radio frequency signals to all end user terminals or CPEs (Customer Premise Equipments) located within the geographical area covered by the cell. The uplink from the CPEs in the area to the base station may be a common medium access uplink, for example a FTDMA (Frequency or Time Division Multiple Access) uplink in which time and frequency carrier slots can in some way be allocated for use by the CPEs to send signals to the base station. The downlink from the base station to the CPEs may be a TDA (Time Division Access) downlink, with time slots over which the base station sends signals to the CPEs.

Another approach to optimising the use of bandwidth is automatic repeat request (ARQ). In this approach the receiving unit, be it a base station or a CPE, detects which signals sent across the transmission link have been received with errors in them and sends a feedback message to the transmitting unit requesting that the signals which have not been correctly received are sent again. This is an alternative way of increasing or decreasing the amount of information which is sent across the transmission link dependent on environmental conditions. In poor transmission conditions, more data will have to be re-sent and so data rates will be low. In good transmission conditions, less data will have to be re-sent and so data rates will be higher. However, this method has a degree of transmission delay inherent within it which may not be appropriate for all multimedia services. It is also inefficient in terms of the amount of uplink or downlink resource used for services requiring a low bit error rate.

It is also known to use forward error correction (FEC) in which a FEC code is added to the data payload of a packet sent across a transmission link. The FEC code is used by the receiving unit to detect and correct errors in the data payload received by the receiving unit.

OBJECT OF THE INVENTION

The present invention seeks to provide an improved cellular radio communication system which uses adaptive modulation and which can provide transmission links having optimised data rates with low bit error rates dependent on the prevailing transmission conditions, while maintaining the links in the poorest transmission conditions. Because links can be maintained in poor transmission conditions the present invention can enable operation over longer distance transmission links.

STATEMENT OF INVENTION

According to a first aspect of the present invention there is provided a cellular radio communication system for transmitting data over a plurality of transmission links comprising means for generating a modulated signal by applying a constant amplitude envelope modulation scheme to data to be transmitted across poor quality transmission links and amplifier means for non-linearly amplifying the modulated signal. By using a constant amplitude envelope modulation scheme higher gain non-linear amplification can be used without prejudicing the ability to recover data from the modulated signal. Thus, signals transmitted over the poorest quality transmission links can have a higher power which enables transmission links to be maintained in poor transmission conditions or over longer distances.

The system preferably additionally comprising means for generating a second modulated signal by applying an amplitude dependent modulation scheme to data to be transmitted across higher quality transmission links and amplifier means for linearly amplifying the second modulated signal. Thus, for higher quality links a higher spectral efficiency can be achieved by the use of amplitude dependent modulation schemes which have to be amplified substantially linearly if the data on them is to be successfully recovered.

According to a second aspect of the present invention there is provided a cellular radio communication system for transmitting data over a plurality of transmission links comprising:

means for generating a first modulated signal by applying an amplitude dependent modulation scheme to data to be transmitted across poor quality transmission links;

means for generating a second modulated signal by applying an amplitude dependent modulation scheme to data to be transmitted across higher quality transmission links; and amplifier means for non-linearly amplifying the first modulated signal and for linearly amplifying the second modulated signal.

The second aspect of the present invention has the same advantages as the first aspect in that high quality transmission links are allocated a high spectral efficiency amplitude dependent modulation scheme and low quality transmission links are allocated an amplitude dependent modulation scheme so that the power of signals across the low quality transmission links can be increased by non-linear amplification of the signals transmitted across it.

The constant amplitude envelope modulation scheme may be GMSK or where conditions allow the more spectrally efficient Multiple Level Continuous Amplitude Modulation (MLCAM).

The means for generating a second modulated signal preferably applies a Quadrature Phase Shift Keying (QPSK) modulation scheme, a 16-QAM (Quadrature Amplitude Modulation) modulation scheme or a 64-QAM (Quadrature Amplitude Modulation) modulation scheme to data to be transmitted across higher quality transmission links depending on the quality of the links and amplifier means for linearly amplifying the second modulated signal. In this way the bandwidth of the system is used efficiently by adaptively selecting the most spectrally efficient modulation scheme for a link which can provide a desired bit error rate.

Preferably the system comprises means for measuring the quality of the transmission links and selecting modulation schemes depending on the measured quality. In this way as the quality of a transmission link varies with time the system is responsive to allocate the most appropriate modulation scheme.

In a preferred embodiment of the system each transmission link is allocated a default modulation scheme for use when a call is initiated which default modulation scheme is the highest spectral efficiency modulation scheme which will deliver a predetermined bit error rate in poor environmental conditions. Thus, calls can be initiated using a default modulation scheme which will deliver the desired bit error rate even in poor environmental conditions. A different modulation scheme may be selected for the call subsequently in response to the measured quality of the transmission link.

The means for generating a second modulated signal may apply a level of forward error correction coding to the data to be transmitted across higher quality transmission links as this will improve the efficiency with which the bandwidth of the system is used.

The transmission links may comprise a point to multi-point link and the system may be a wireless access system.

According to a third aspect of the present invention there is provided a transmitting unit for a cellular radio communication system for transmitting data over at least one transmission link comprising:

means for generating a first modulated signal by applying a constant amplitude envelope modulation scheme to data to be transmitted across a poor quality transmission link;

means for generating a second modulated signal by applying an amplitude dependent modulation scheme to data to be transmitted across a higher quality transmission link; and amplifier means for non-linearly amplifying the first modulated signal and for linearly amplifying the second modulated signal.

The transmitting unit has the same advantages and the same preferred features as the system according to the present invention. In particular the transmitting unit may comprise means responsive to communications from a receiving unit about the quality of a transmission link wherein said means selects a modulation scheme for the transmission link depending on the communication.

According to a fourth aspect of the present invention there is provided a receiving unit for a cellular radio communication system for receiving data over at least one transmission link comprising:

means for recovering data from signals modulated according to a constant amplitude envelope modulation scheme; and means for recovering data from signal modulated signal modulated according to an amplitude dependent modulation scheme.

The receiving unit has the same advantages and the same preferred features as the system according to the present invention. The receiving unit preferably comprises means for measuring the quality of a transmission link from a transmitting unit and means for communicating the measured quality to a transmitting unit.

According to a fifth aspect of the present invention there is provided a method of operating a cellular radio communication system for transmitting data over a plurality of transmission links comprising the steps of:

generating a modulated signal by applying a constant amplitude envelope modulation scheme to data to be transmitted across poor quality transmission links; and non-linearly amplifying the modulated signal.

The method may additionally comprise the steps of:

generating a second modulated signal by applying an amplitude dependent modulation scheme to data to be transmitted across higher quality transmission links; and linearly amplifying the second modulated signal.

The method has the same advantages as the system according to the present invention.

BRIEF DESCRIPTION OF DRAWINGS

One embodiment of the present invention will now be described in relation to the accompanying Figures in which.

DETAILED DESCRIPTION OF INVENTION

Figure 2:
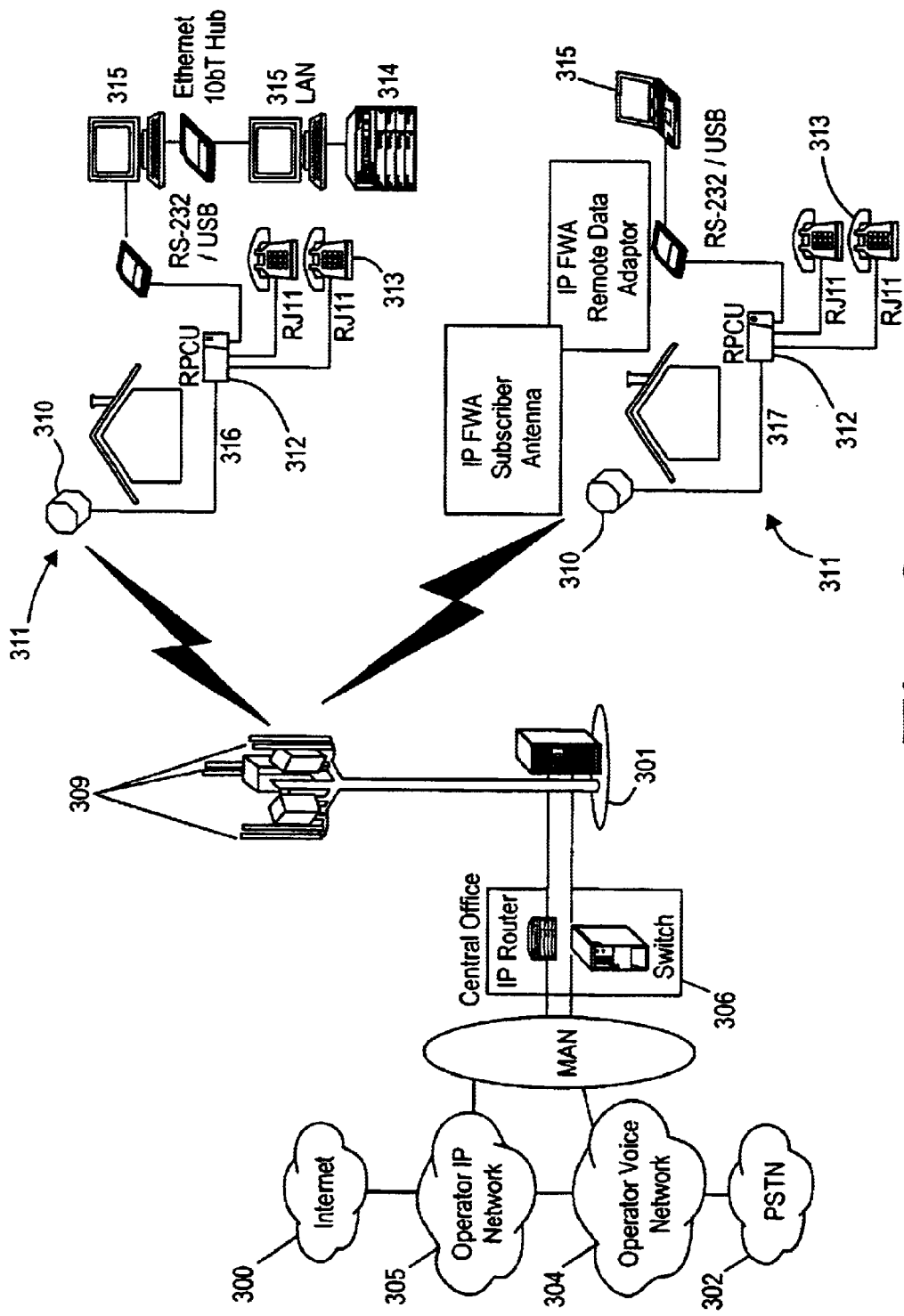
FIG. 2 is a schematic representation of a fixed wireless access architecture suitable for use with a cellular radio communication system according to the present invention.

FIG. 2 shows a fixed wireless access architecture suitable for use in a cellular radio communication system according to the present invention. The architecture comprises a fixed wireless access base station (301) which can transmit radio frequency signals to a plurality of CPEs (Customer Premise Equipments) (311) within a localised area or cell. The base station has an array of antennas (309) for transmitting signals to and receiving signals from antennas (310) which form part of the CPEs (311). The antennas (310) located at a subscriber's premises and the base station antennas (309) are generally located in a raised position at some distance from the ground in order to reduce the effect of obstacles in the transmission paths between the base station and the CPEs. In this way a line of sight (LOS) or near line of sight (NLOS) transmission link can be achieved between the base station and each CPE within the cell. The CPE antennas (310) are each connected to associated remote power control units (RPCUs) (312) which are themselves connected to associated telephone (313), facsimile (314) and computing (315) equipment.

In the example shown in FIG. 2, the base station (301) is connected to the Public Switched Telephone Network (PSTN) (302) which provides telephone services via operator voice network (304). The base station (301) is also connected to the Internet (300) via operator IP (Internet Protocol) network (305). The operator networks (304) and (305) are connected to the base station (301) via a central office (306) which provides separate data links for voice and data. The central office (306) is connected to the operator IP network (305) and the Operator Voice Network (304) via a Metropolitan Area Network (MAN) used to interconnect LANs (Local Area Networks) around a town or city.

Figure 6:
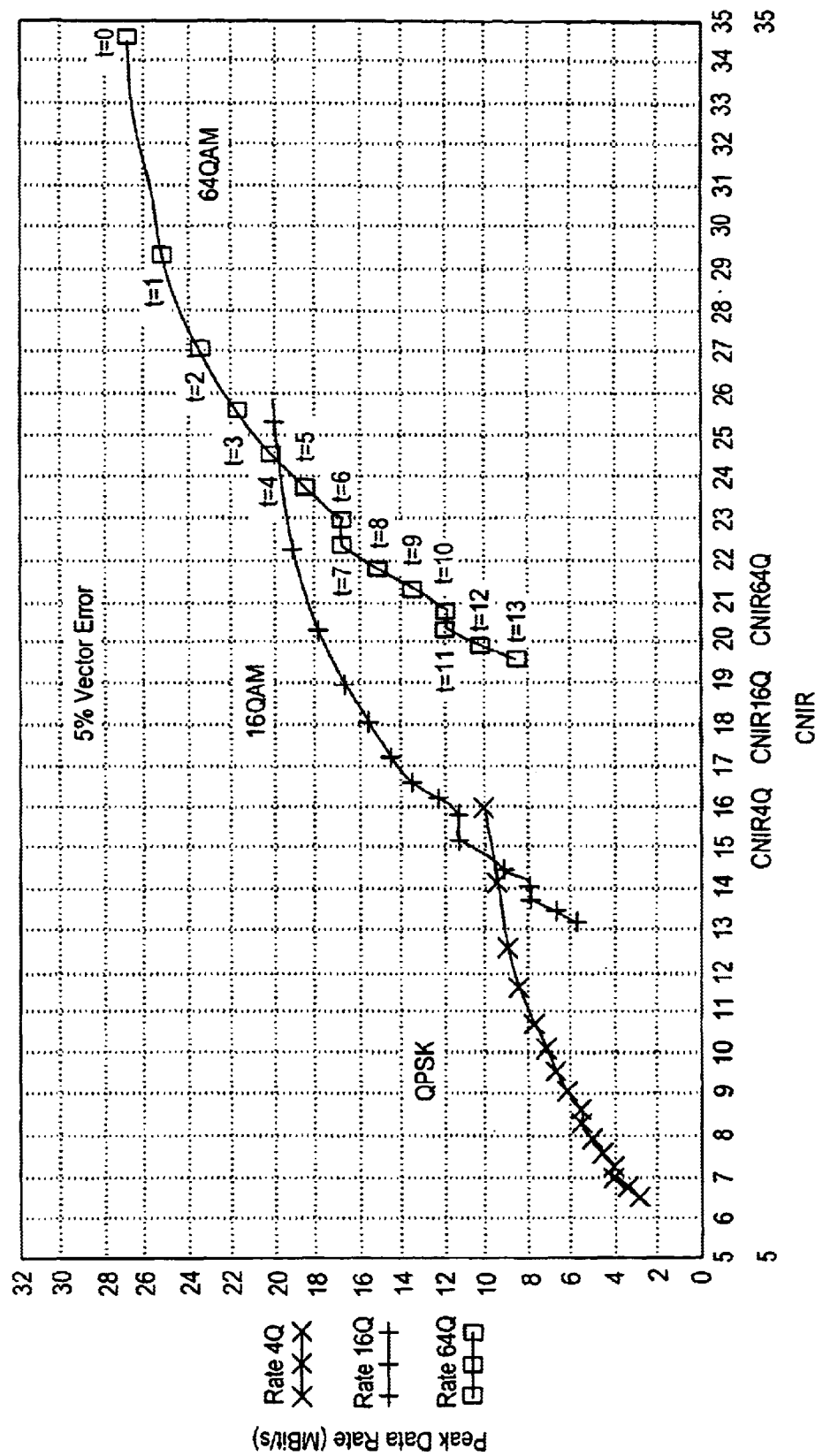
FIG. 6 is a graph showing the peak data rate achievable according to the present invention for varying carrier to noise interference ratios (CNIRs) for QPSK, 16-QAM and 64QAM modulation schemes assuming a signalling rate (symbol rate) of 5 Mbaud.

According to the present invention for transmission links having a CNIR (Carrier to Noise Interference Ratio) above a threshold level, a level of FEC (forward error correction) coding and an amplitude dependent modulation scheme is selected which provides an optimised data rate for a transmission link between a base station and a CPE in accordance with the graph shown in FIG. 6 for a CNIR (carrier to noise and interference ratio) detected for that transmission link. Signals modulated according to an amplitude dependent modulation scheme are linearly amplified before transmission by an amplifier operating in its linear region. For CNIR levels that cannot support a QPSK modulated signal at the required bit error rates, for example CNIR levels below a threshold value determined by a system specific link budget, a modulation scheme which generates a modulated signal with a substantially constant amplitude envelope, such as GMSK (Gaussian Minimum Shift Keying) or Multiple Level Continuous Amplitude Modulation (MLCAM) is selected. Signals modulated using GMSK or MLCAM are non-linearly amplified before transmission by an amplifier operating in its non-linear higher gain region. The use of a higher gain enables transmission links to be maintain even in the poorest environmental conditions. When GMSK or MLCAM modulation is used, a digital signal processor can shift the amplifier operating point to operate the amplifier in its non-linear region and when QPSK, 16-QAM or 64-QAM modulation is used the digital signal processor can shift the amplifier operating point to operate the amplifier in its linear region. Alternatively, separate amplifiers of different types can be used for amplitude dependent modulation schemes and constant amplitude envelope modulation schemes and a digital signal processor can be used to direct a signal through the relevant type of amplifier depending on the type of modulation used. Increasing the power of signal transmitted, by using non-linear amplification, increases the signal to noise value or carrier to interference value of a transmission link, thus maximising the link's tolerance to noise and interference. The result is to increase radio link availability during potential noise, interference or power limited situations or to offer greater coverage distances.

The graph in FIG. 6 is Used to select the most appropriate amplitude dependent modulation scheme for CNIR levels above a certain threshold and is based on a constant symbol rate of 5 Mbaud and a constant bit error rate of $10^{-9}$. In this illustrative example the type of FEC coding used is BCH (Bose, Chaudhuri and Hocquenghem), however other code types could be used. Starting from the right of FIG. 6, for a high quality transmission link having a CNIR of 35, then a 64-QAM modulation scheme can be used with no FEC coding. Moving towards the left on the 64-QAM curve of FIG. 6, successive boxes marked on the curve indicate a step in the level of FEC coding, from t=0 to 13. For example, for a CNIR of between 29 and 34 a level 1 FEC code (ie. t=1) has to be used and for a CNIR of between 27 and 29 a level 2 FEC code has to be used to maintain a BER of $10^{-9}$. Where the 64-QAM and 16-QAM plots overlap, the modulation scheme/FEC pairing which generates the highest data rate is preferentially selected. For example, for a CNIR of 25, 64-QAM modulation and a level 4 FEC code will provide the highest data rate, whereas for a CNIR of 21, 16-QAM modulation and a level 2 FEC code will provide the highest data rate. Moving towards the left on the 16-QAM curve of FIG. 6, successive boxes marked on the curve indicate a step in the level of FEC coding, from t=0 to 15. Moving further to the left of FIG. 6, for a CNIR of 18 then a 16-QAM modulation scheme and a level 4 FEC code are selected. Again, where the 16-QAM and the QPSK plots overlap, the modulation scheme/FEC pairing which generates the highest data rate is preferentially selected. For example, for a CNIR of 16, 16-QAM modulation and a level 7 FEC code will provide the highest data rate, whereas for a CNIR of 14, QPSK modulation and a level 1 FEC code will provide the highest data rate. Moving towards the left on the QPSK curve of FIG. 6, successive boxes marked on the curve indicate a step in the level of FEC coding, from t=0 to 15. Moving further to the left of FIG. 6, for a CNIR of 11 then a QPSK modulation scheme and a level 4 FEC code are selected.

Degraded channel conditions will cause steps down in modulation constellations from 64-QAM to QPSK as discussed above, due to reduced CNIR levels. Any further degredation in transmission link quality may jeopardise the integrity of the link. Switching to modulation techniques, such as GMSK or MLCAM and increasing transmission power by using non-linear amplification can combat attenuated transmission link conditions. A typical transmission power increase achieved by switching to non-linear amplification is 10 to 20 dB. If a GMSK modulation scheme is applied, for a fixed bandwidth of transmission link the data rate of the link would be reduced as compared to QPSK because of the lower spectral efficiency of GMSK. However, as an alternative to GMSK, MLCAM may be used where the signal to noise or interference to carrier ratios of the non-linearly amplified signal allow. Using MLCAM may increase the data rate for a fixed bandwidth of transmission link as compared to using QPSK. Thus, MLCAM could be used instead of QPSK where it can deliver greater data rates in order to maximise spectral use and not only when the CNIR level drops below the threshold level.

Figure 3:
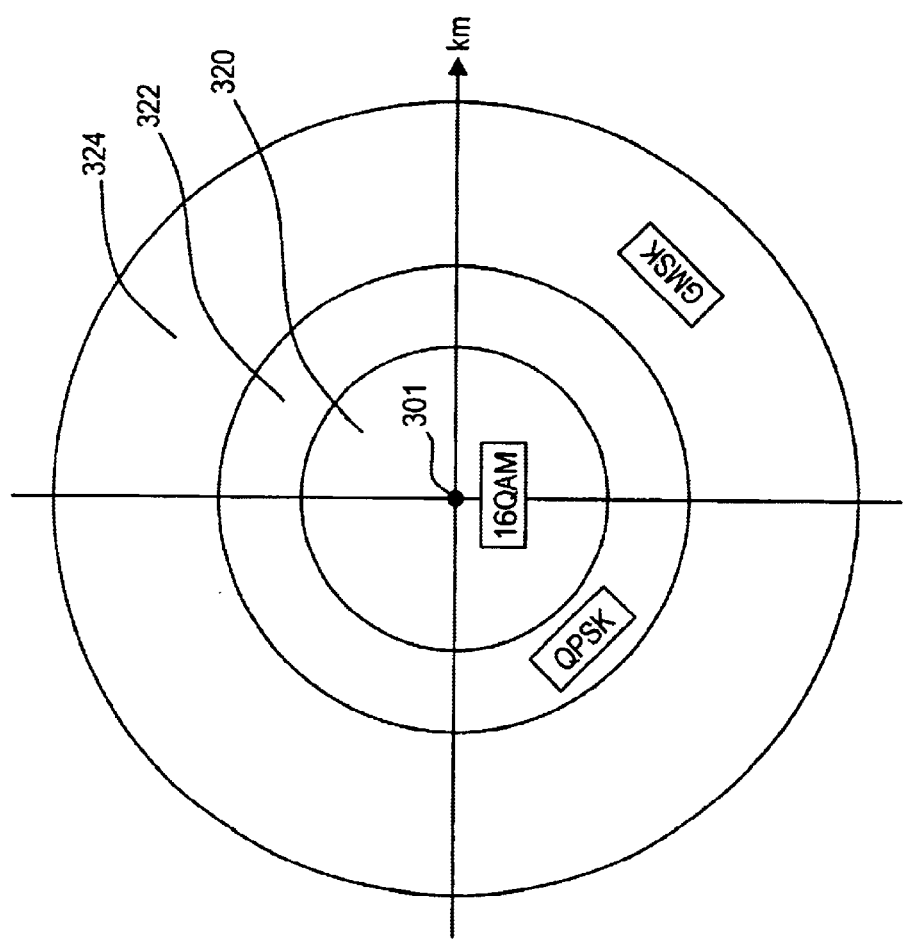
FIG. 3 is a schematic representation of a cell of a cellular radio communication system according to the present invention in which different default modulation schemes are allocated to different regions of the cell dependent on distance from the base station.

The modulation scheme and FEC allotted to a transmission downlink between a base station and a CPE is preferably allocated based on a measurement made by the CPE, ie. the CPE measures the quality of the downlink. This measurement is then conveyed to the base station via the uplink. At the start up of a call a default modulation technique is used which will generally be the most robust modulation technique for the CPE concerned. The default modulation could for example be allocated depending on the position of the CPE in the cell in accordance with FIG. 3. FIG. 3 shows a cell with a base station (301) located at its centre. Then CPEs located closest to the base station in the central ring (320) are allocated a default modulation scheme of 16-QAM, CPEs located further away from the base station in the inner annulus (322) are allocated a default modulation scheme of QPSK, CPEs located furthest away from the base station in the outer annulus (324) are allocated a default modulation scheme of GMSK. The default modulation scheme is selected to be the highest spectral efficiency modulation scheme which will deliver the required bit error rate in the worst environmental conditions. As the call progresses and feedback as to the quality of the transmission downlink is received by the base station, the modulation and coding can adjusted to optimise data throughput while delivering the required bit error rate.

Figure 9:
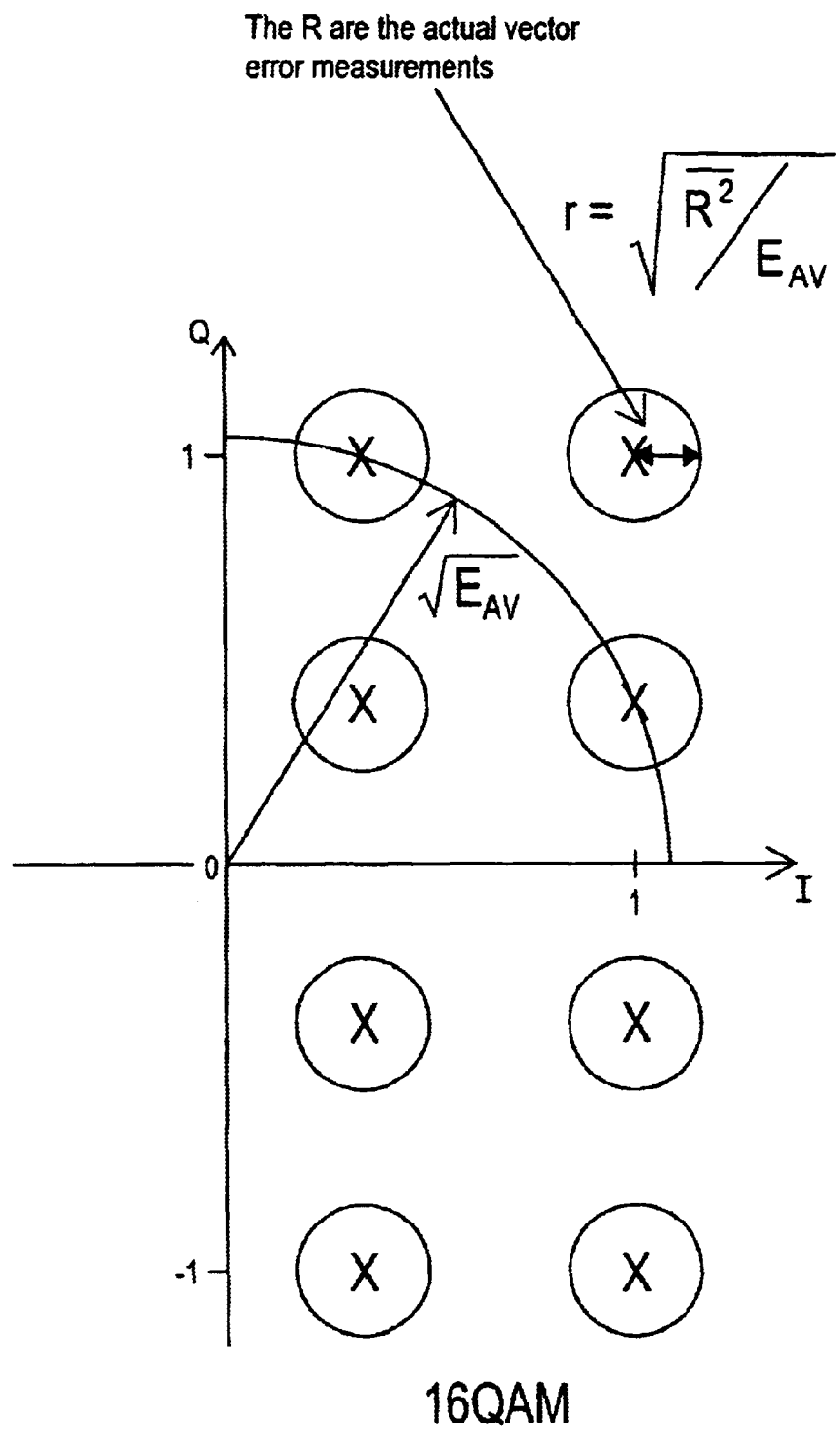
FIG. 9 represents an IQ modulation plot for a 16-QAM modulation scheme showing the basis on which the carrier to noise and interference ratio of a carrier is measured.

The CNIR level will be calculated from a measurement vector error. Vector error can be calculated in the conventional manner by calculating the RMS (root means square) value of the spread of detected symbols (constellation points) around the actual (unperturbed) value of that symbol. For example, referring to FIG. 9, for a 16-QAM modulation scheme for 1 going from 0 to 1 and Q going from −1 to 1, the positions of the symbols or constellation points are shown by an X. When a 16-QAM modulated signal is transmitted over a transmission link and then demodulated, the detected values will be spread about each constellation point due to the effects of noise and interference on the transmission link. The CNIR value is $10\log(r^2)$ where r is the RMS value.

Figure 4:
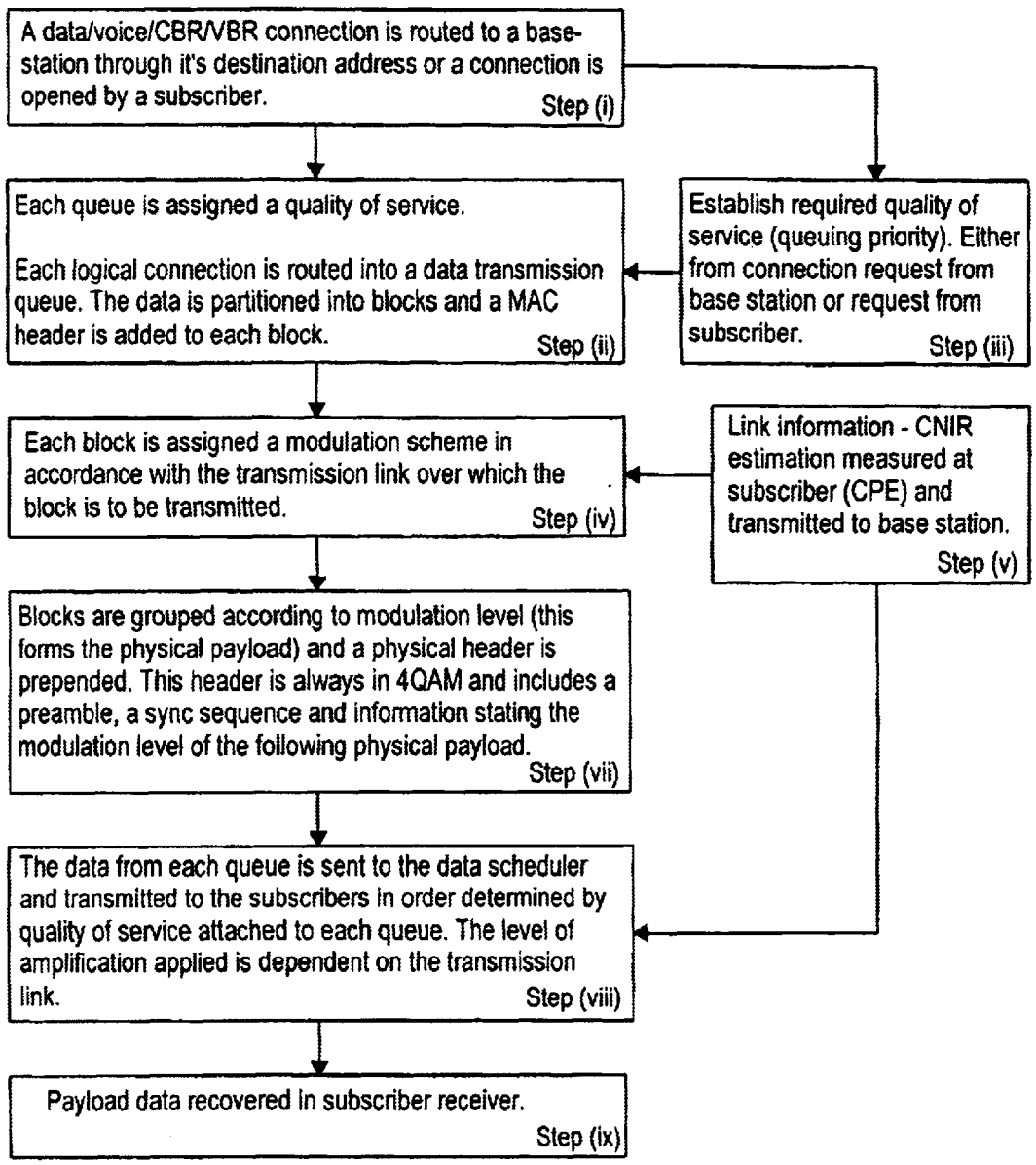
FIG. 4 is a flow chart showing the steps involved in the transmission of packets across the downlink, ie. from base station to CPE in accordance with the present invention.

The flow chart in FIG. 4 shows the steps in the formation and transmission of signals across the downlink, ie. from base station to the CPEs according to one embodiment of the present invention.

When a call is initiated outside of the cell to a CPE within the cell it is routed via the base station. It may for example be a data, voice, constant bit rate (CBR) or variable bit rate (VBR) call and will have associated with it a required quality of service. The term "call" is used here to cover both traditional switched connection based systems, such as ATM and connectionless systems, such as IP. Each such call is routed via the base station in accordance with a connection set up between a location outside of the cell and the customer or in accordance with packet header information (STEP i).

Figure 7:
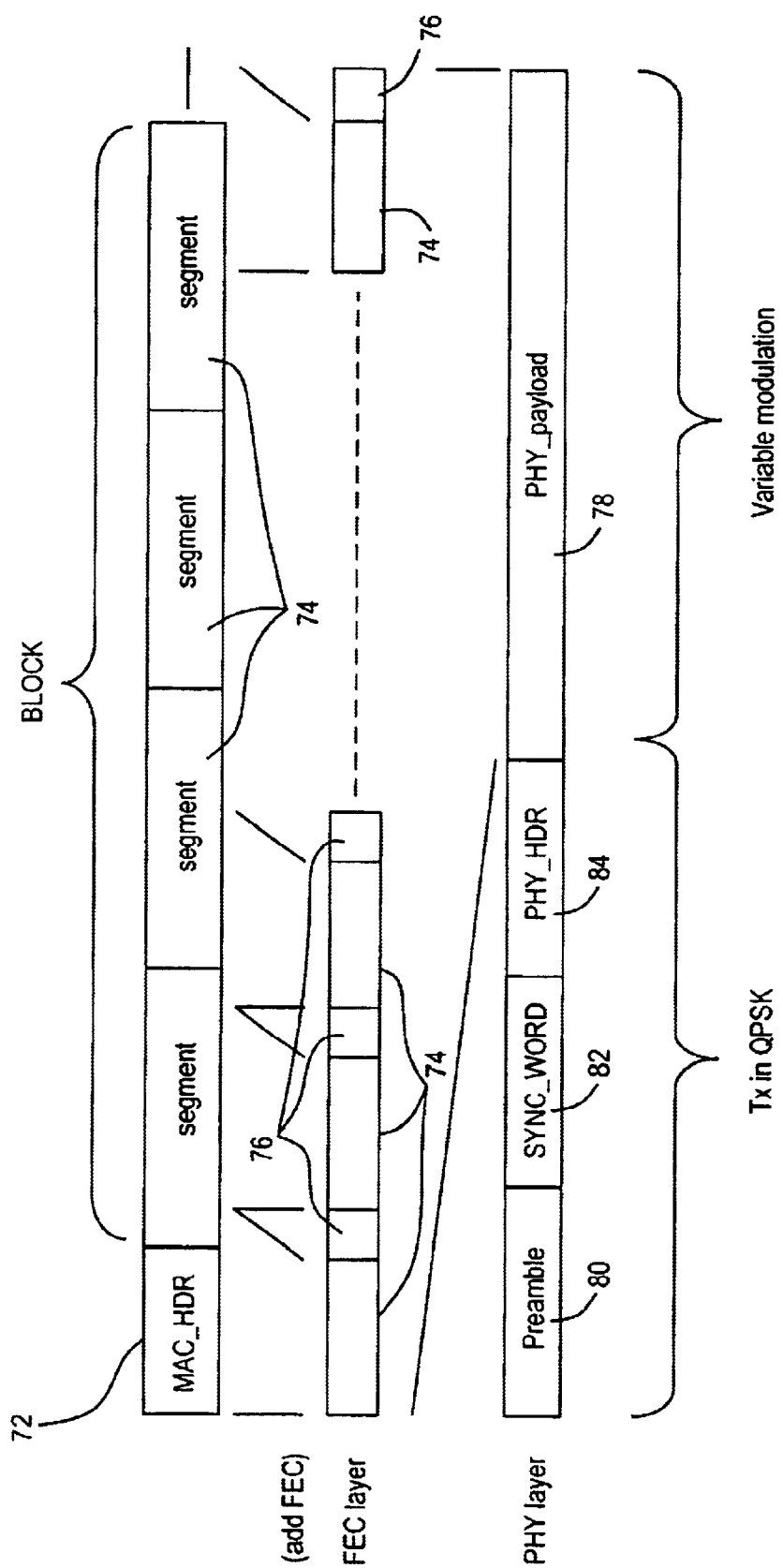
FIG. 7 shows schematically how blocks of data are assembled for transmission across a carrier according to the present invention.

Each call is routed into a data transmission queue in accordance with its requested quality of service (via STEP iii). The data in each queue is partitioned into blocks and a Medium Access Control (MAC) header (72) is added to each block, as shown in the top layer of FIG. 7 (STEP ii). Each block is assigned a modulation scheme and FEC coding level depending on the quality measurement made by the CPE which the block is to be sent to, which measurement is transmitted to the base station (STEP iv and v). As the call progresses the base station will receive ongoing feedback from the CPEs in the cell about the quality of the downlink and will alter the modulation and coding scheme accordingly. Each block is then partitioned into segments (74) and the appropriate FEC coding (76) is added to each segment, as shown in the middle layer of FIG. 7 (STEP vi). The blocks are then re-assembled from the segments with FEC coding added and the blocks are grouped according to their allocated modulation level as shown in the bottom or physical layer of FIG. 7. These groupings of blocks form the physical payload (78) for the physical layer to which is pre-appended a physical layer header, as shown in the bottom layer of FIG. 7 (STEP vii). This header is always allocated a default modulation and includes a preamble (80), a sync sequence (82) and information (84) stating the modulation and coding applied to the following physical payload (78). The thus, configured data from each queue is then sent to the base station data scheduler. The data is transmitted to the subscribers across the transmission link in an order determined by the quality of service associated with each queue and having been amplified either linearly or non-linearly in accordance with the modulation scheme used. Thus, where an amplitude dependent modulation scheme is used, linear amplification is applied and where a constant amplitude envelope modulation scheme is used, nonlinear higher gain amplification is applied. (STEPs v and viii). At the CPE the information in the physical header is recovered using the default modulation and for example using a correlation code. The physical payload is then recovered by demodulation using the demodulation and coding scheme set out in the physical header (STEP ix).

Figure 5:
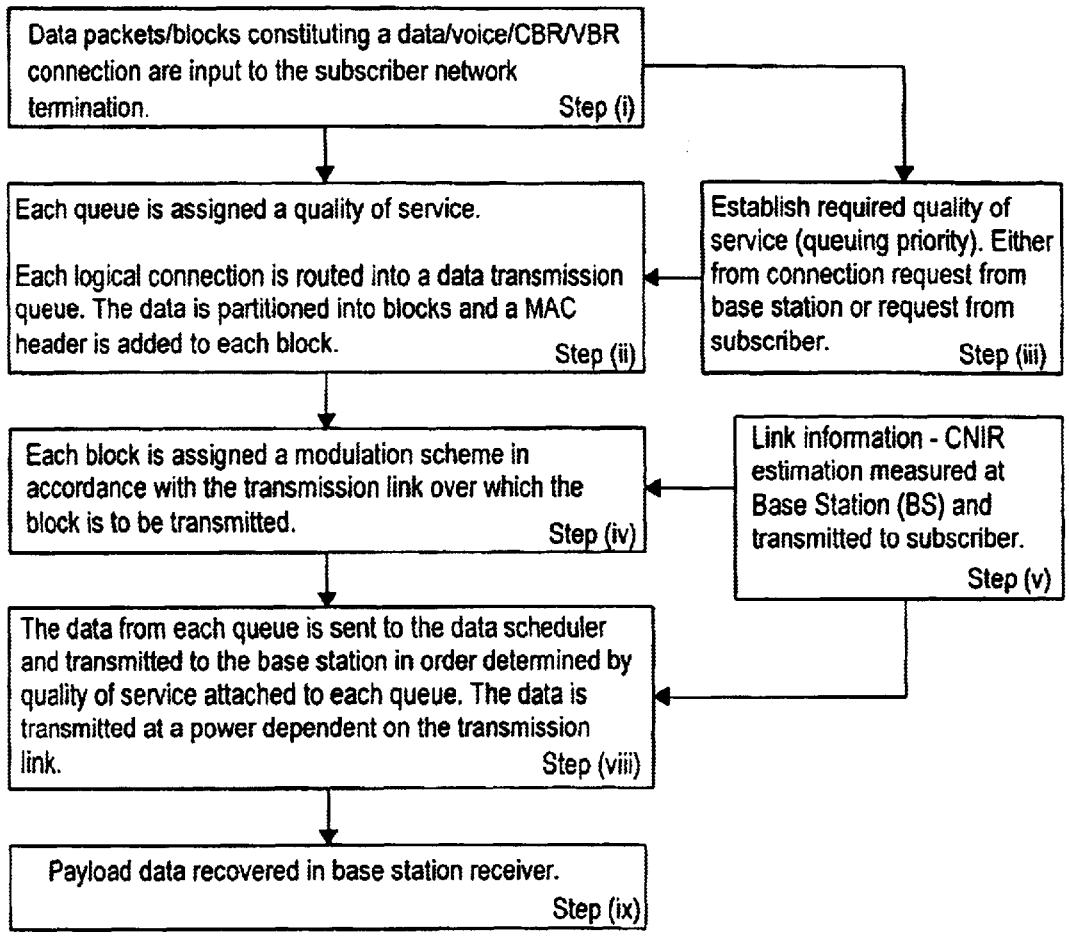
FIG. 5 is a flow chart showing the steps involved in the transmission of packets across the uplink, ie. from the CPE to the base station in accordance with the present invention.

The flow chart in FIG. 5 shows the steps in the formation and transmission of signals across the uplink, ie. from a CPE to the base station.

Where a call is initiated by a CPE a request will be made by the CPE to the base station. The call may for example be a data, voice, constant bit rate (CBR) or variable bit rate (VBR) call and will have associated with it a required quality of service. Again, the term "call" is used here to cover both traditional switched connection based system, such as ATM or connectionless system, such as IP. Each such call is routed via the base station in accordance with a connection set up between the customer and a location outside of the cell or in accordance with packet header information (STEP i). The request will be made by the CPE, for example on a contention basis, using a default modulation scheme. The default modulation scheme may be associated with the CPE's location with respect to the base station, for example in accordance with FIG. 3, for worst case environmental conditions. If the base station receives the request, it will measure the quality of the transmission uplink and respond to the CPE sending time slot allocations on the uplink and in accordance with the measured quality of the transmission link sending the modulation type and FEC coding level which the CPE is to use. The CPE will continue to make requests for a call until the base station responds.

Each call is routed in the CPE into a data transmission queue in accordance with its requested quality of service (via STEP iii). The data to be transmitted to the base station is partitioned into blocks and a Medium Access Control (MAC) header (72) is added to each block, as shown in the top layer of FIG. 7 (STEP ii). Each block is assigned a modulation scheme and FEC coding level depending on the measurement of quality of the uplink made by the base station and last transmitted to the CPE. As the call progresses the CPE will receive ongoing feedback from the base station about the quality of the uplink and will alter the modulation scheme and coding in response (STEP iv and v). Each block is then partitioned into segments (74) and the appropriate FEC coding (76) is added to each segment, as shown in the middle layer of FIG. 7 (STEP vi). The blocks are then re-assembled from the segments with FEC coding added and the blocks are grouped according to their allocated modulation level as shown in the bottom or physical layer of FIG. 7 (STEP vii). These groupings of blocks form the physical payload (78) for the physical layer to which is pre-appended a physical layer header, as shown in the bottom layer of FIG. 7. Again, this header is always allocated a default modulation and includes a preamble (80), a sync sequence (82) and information (84) stating the modulation and coding applied to the following physical payload. The thus, configured data from each queue is then sent to the CPE data scheduler. The data is transmitted to the base station across the transmission link in an order determined by the quality of service associated with each queue and having been amplified either linearly or non-linearly in accordance with the modulation scheme used. Thus, where an amplitude dependent modulation scheme is used, linear amplification is applied and where a constant amplitude envelope modulation scheme is used, non-linear higher gain amplification is applied. (STEPs v and viii). At the base station the information in the header is recovered using default modulation signal detection and for example using correlation codes. The physical payload is then recovered by demodulation using a demodulation and coding scheme as set out in the physical header (STEP ix).

Using adaptive modulation and FEC coding as described above results in a more efficient use of bandwidth within a cell. Using constant amplitude envelope modulation schemes in combination with non-linear amplification maintains transmission links in poor environmental conditions. This will increase user confidence because of the higher link availability offered using this system. Increased coverage areas can be serviced by each base station if the present invention is used. This will reduce the number of base stations required to serve a given geographical region, thus reducing infrastructure costs.

FIGS. 10 to 13 show a suitable configuration of a base station and CPE for use in the cellular radio communication system according to the present invention.

Figure 10:
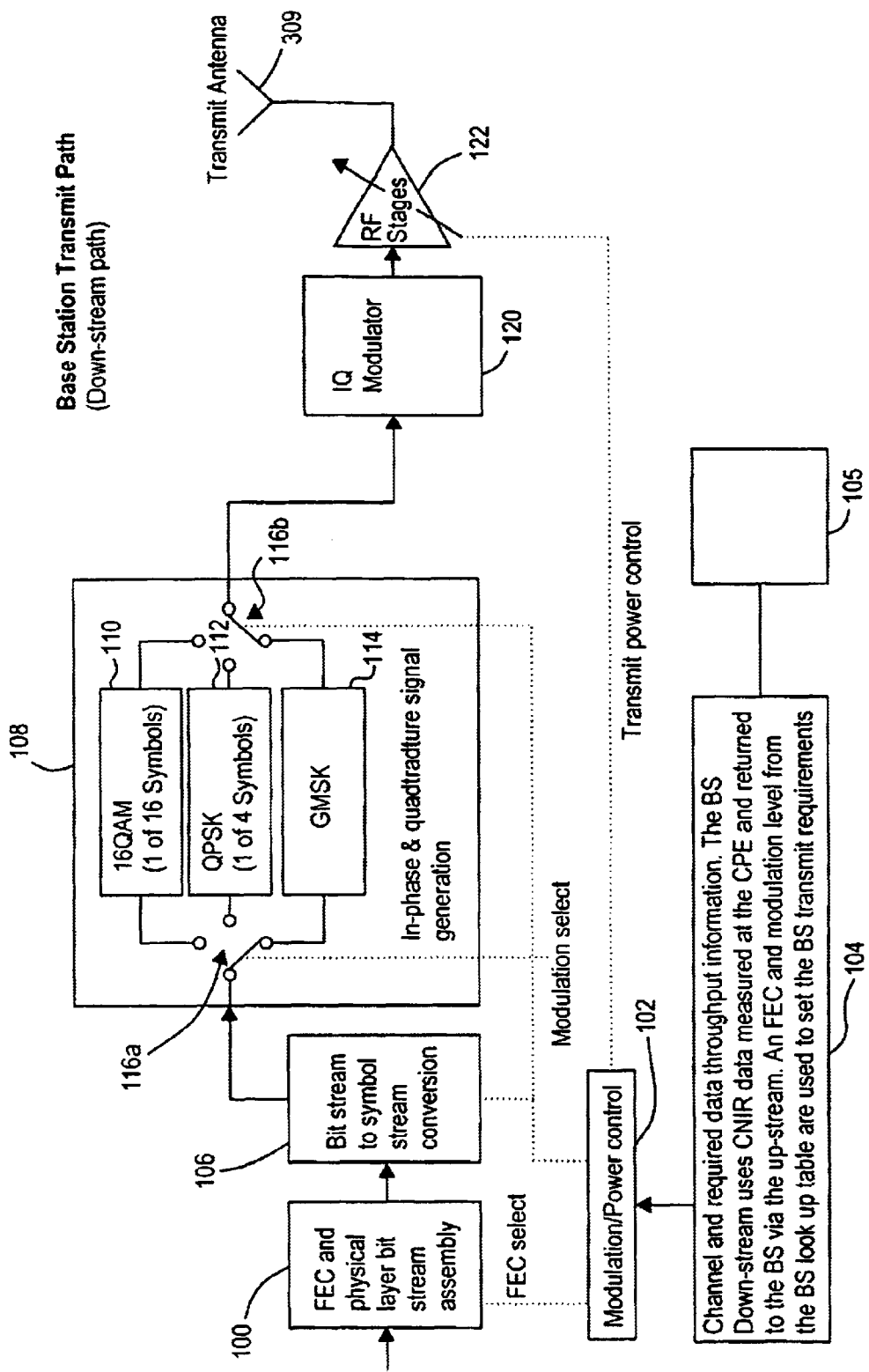
FIG. 10 shows the configuration of a base station transmit path according to the present invention.

FIG. 10 shows the configuration of the base station transmit path. The blocks of data with the MAC headers applied (as shown in the top layer of FIG. 7 and as generated by STEP ii of FIG. 4) is input into the FEC and physical layer bit stream assembly means (100). A level of FEC coding is applied to the blocks of data by the means (100) (as described in STEPs iv and vi of FIG. 4) in response to a FEC coding level input into the means (100) by the modulation/power controller (102). The FEC coding level, modulation scheme and signal power to be applied at any time to the data blocks passing through the base station transmit path is fed to the modulation/power controller by the base station processor (104).

The base station processor (104) will receive the CNIR measurements from the CPEs in the cell and will interrogate a look up table or database (105) embodying the information in the graph of FIG. 6 and including a CNIR threshold level below which a GMSK or a MLCAM modulation scheme in combination with non-linear amplification are proscribed and will select a coding and a modulation scheme for the data blocks in accordance with the CNIR measurement from their destination CPE.

The blocks of data output from the means (100) are input into the bit stream to symbol conversion means (106). The controller (102) inputs the modulation scheme to be applied to the data block for the data block then passing through the means (106) based on an input from the base station processor (104) which will have selected the required modulation scheme as discussed above. The IQ signal conversion block (108) comprises a 16-QAM IQ signal conversion arm (110), a QPSK IQ signal conversion arm (112), a GMSK signal conversion arm (114) and a pair of switch means (116a, 116b) for selecting the required arm (110), (112) or (114) depending on an input signal from the modulation/power controller (102). Depending on the data block passing through the IQ signal conversion block (108) the controller (102) will send a signal to the switch means (116a, 116b) dependent on the modulation scheme required for that data block and the switch means will switch to a position such that the data block passes through the required arm. The IQ signal conversion block (108) generates the voltage amplitudes that form the I and Q signals required to represent each bit in a data block dependent on the modulation scheme to be applied to that data block. The 16-QAM arm (110) and the QPSK arm (112) will also include appropriate filtering means, such as a Finite Impulse Response (FIR) shaping filter. The I and Q signals are then input into the IQ modulator (120). Additional filtering means are not required in the GMSK arm (114).

For example, where a data block requires GMSK modulation, then in response to the signal input from the controller (102) the switch means (116a, 116b) will switch to the position shown in FIG. 10 and the IQ signal conversion arm (114) will generate GMSK I and Q signals and the output will be passed through the IQ modulator (120). The GMSK IQ signal can be generated by a number of methods and the GMSK block (114) may require some memory. Where a data block requires QPSK modulation, then in response to the signal input from the controller (102) the switch means (116a, 116b) will switch so that the QPSK arm (112) will generate QPSK I and Q signals which will be passed to the IQ modulator (120). The IQ modulator will generate a carrier wave modulated with 4 states. Where a data block requires 16-QAM modulation, then in response to the signal input from the controller (102) the switch means (116a, 116b) will switch so that the 16-QAM arm (110) will generate 16-QAM I and Q signals which will be passed to the IQ modulator (120). The IQ modulator will generate a carrier wave modulated with 16 states. The IQ signal conversion block (108) could additionally be provided with a 64-QAM arm for generating 64-QAM I and Q signals.

The signal output from the IQ modulator is then upconverted and amplified by amplifier (122) and transmitted over the downlink via antenna (309). The mode of operation of the amplifier (122) is dependent on an input from the modulation/power controller (102) dependent on the type of modulation applied to the signal. The level of power to be applied to a signal output from the base station transmit path at any time will be set by the base station processor (104), as indicated above and input into the amplifier (122) via the controller (102). Thus, for 16-QAM or QPSK modulated signals the amplifier (122) will be shifted by the modulation/power controller (102) to operate in its linear region at moderate gain. However, for GMSK modulated signals the amplifier (122) will be shifted by the modulation/power controller (102) to operate in its non-linear region at higher gain.

Figure 11:
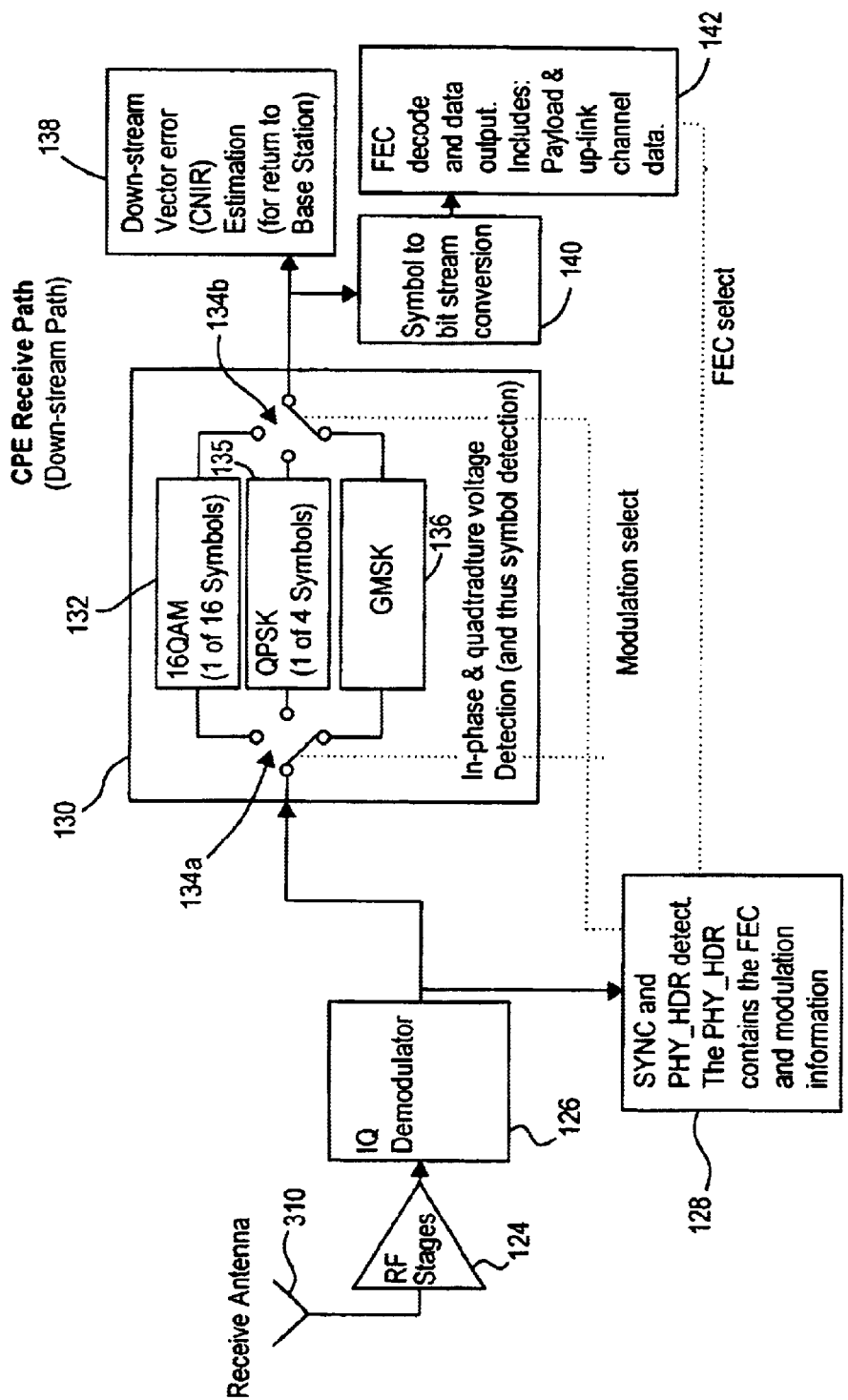
FIG. 11 shows the configuration of a CPE receive path according to the present invention.

FIG. 11 shows the CPE receive path. The CPE receives signals transmitted over the downlink via the antenna (310) and the received signal is downconverted in the rf stages (124) and demodulated in IQ demodulator (126). The output from the demodulator is input into a header information recovery means (128), which detects default modulation signals and recovers the header information, for example by applying correlation coding. The header information will include the modulation scheme and FEC coding level required to recover the data in the payload associated with the header. The output of the demodulator is also input into an IQ signal detection block (130). The recovery means (128) recovers the modulation scheme associated with the incoming payload and actuates switching means (134a, 134b) to switch the data output from the IQ modulator through the correct arm of the IQ signal detection block. The arm (132) is arranged to detect IQ signals sent using a 16-QAM modulation scheme, the arm (135) is arranged to detect IQ signals sent using a QPSK modulation scheme and the arm (136) is arranged to detect IQ signals using a GMSK modulation scheme. The arms (132) and (135) will include appropriate filtering means, such as a FIR matched pulse shaping filter.

For example where a physical payload sent using a GMSK modulation scheme is received and demodulated the recovery means (128) detects this and switches the switching means (134a, 134b) to the position shown in FIG. 11, so that the payload is passed through the arm (136) of the IQ signal detection block (130). Where a physical payload sent using a QPSK modulation scheme is received and demodulated the recovery means (128) detects this and switches the switching means (134a, 134b) so that the payload is passed through the arm (135) of the IQ signal detection block (130). Where a physical payload sent using a 16-QAM modulation scheme is received and demodulated the recovery means (128) detects this and switches the switching means (134a, 134b) so that the payload is passed through the arm (132) of the IQ signal detection block (130).

The output from the IQ signal detection block (130) is input into a vector error detection means (138). This measures the quality of the downlink and then passes this information into the CPE return path for transmission back to the base station for use by the base station processor (104).

The output from the IQ signal detection block is also passed to the symbol to bit conversion means (140). The data block output from the means (140) is decoded in decoding means (142) using the FEC coding level for that data block which is input from the recovery means (128).

Figure 12:
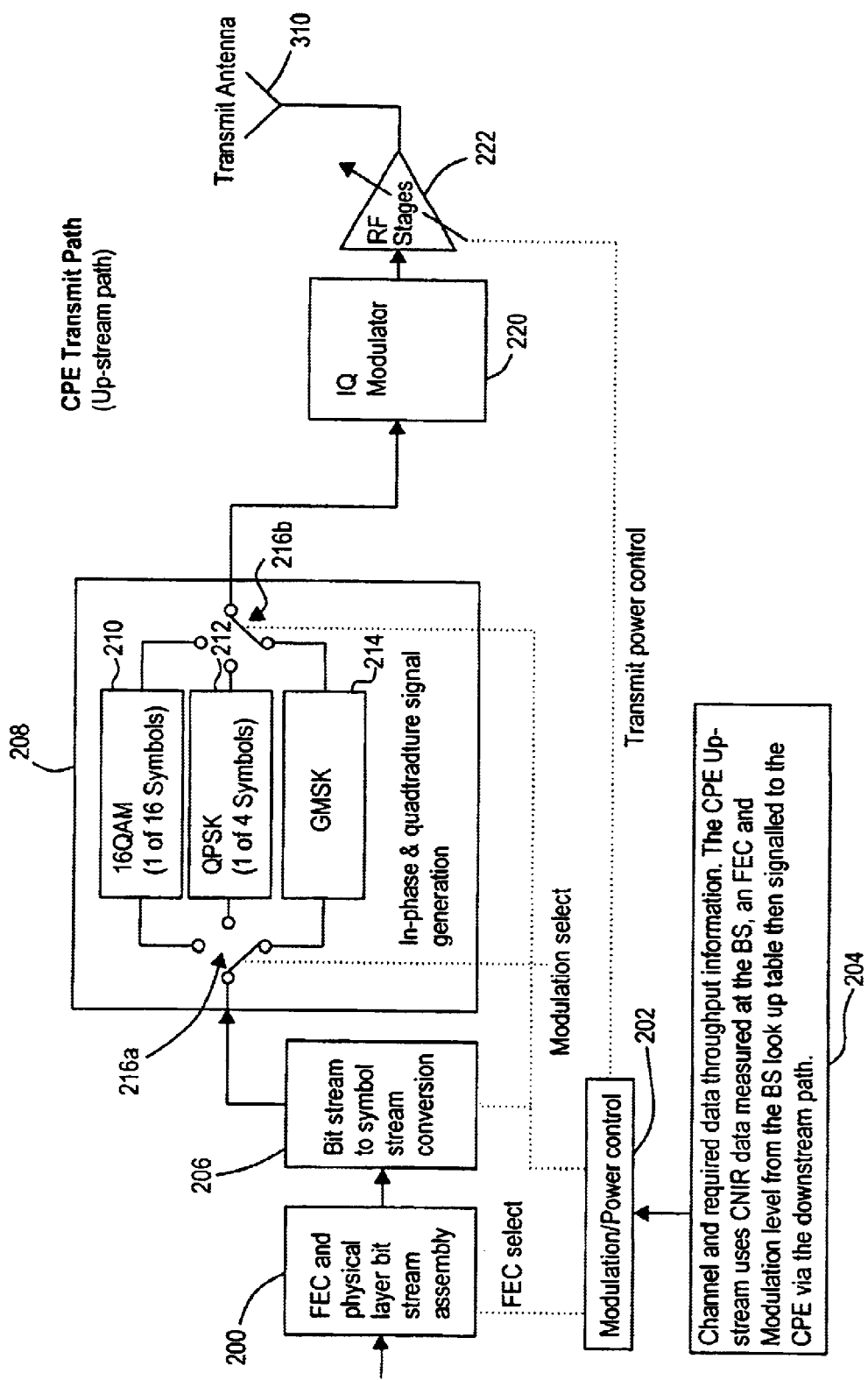
FIG. 12 shows the configuration of a CPE transmit path according to the present invention.

Referring now to FIG. 12 which shows the CPE transmit path. The blocks of data with the MAC headers applied (as shown in the top layer of FIG. 7 and as generated by STEP ii of FIG. 5) is input into the FEC and physical layer bit stream assembly means (200). A level of FEC coding is applied to the blocks of data by the means (200) (as described in STEPs iv and vi of FIG. 5) in response to a FEC coding level input into the means (200) by the modulation/power controller (202). The FEC coding level, modulation scheme and amplifier gain to be applied at any time to the data blocks passing through the CPE transmit path is fed to the modulation/power controller by the CPE processor (204).

The CPE processor will receive the allocated FEC coding level and modulation scheme from the base station. The allocated level of coding is then applied to the means (200) via the modulation/power controller (202) for the block of data passing through the means (200).

The blocks of data output from the means (200) are input into the bit stream to symbol conversion means (206), which converts the input bit stream into an output symbol stream. The controller (202) inputs the modulation scheme to be applied to the data block for the data block then passing through the means (206) based on an input from the CPE processor (204) which will have selected the required modulation scheme as discussed above. The IQ signal conversion block (208) comprises a 16-QAM IQ signal conversion arm (210), a QPSK IQ signal conversion arm (212), a GMSK signal conversion arm (214) and a pair of switch means (216a,216b) for selecting the required arm (210), (212) or (214) depending on an input signal from the modulation/power controller (202). Depending on the data block passing through the IQ signal conversion block (208) the controller (202) will send a signal to the switch means (216a,216b) dependent on the modulation scheme required for that data block and the switch means will switch to a position such that the data block passes through the required arm. The arms (210) and (212) include appropriate filtering means, such as a FIR shaping filter. The arm (214) does not require filter means. The IQ signal conversion block (208) generates the voltage amplitudes that form the I and Q signals required to represent each bit in a data block dependent on the modulation scheme to be applied to that data block. The I and Q signals are then input into the IQ modulator (220).

For example, where a data block requires GMSK modulation, then in response to the signal input from the controller (202) the switch means (216a,216b) will switch to the position shown in FIG. 12 and the IQ signal conversion arm (214) will generate GMSK I and Q signals and the output will be passed through the IQ modulator (220). Where a data block requires QPSK modulation, then in response to the signal input from the controller (202) the switch means (216a,216b) will switch so that the QPSK arm (212) will generate QPSK I and Q signals which will be passed to the IQ modulator (220). The IQ modulator will generate a carrier wave modulated with 4 states. Where a data block requires 16-QAM modulation, then in response to the signal input from the controller (202) the switch means (216a,216b) will switch so that the 16-QAM arm (210) will generate 16-QAM I and Q signals which will be passed to the IQ modulator. The, IQ modulator will generate a carrier wave modulated with 16 states.

The signal output from the IQ modulator is then upconverted and amplified by amplifier (222) and transmitted over the uplink via antenna (310). The level of power generated by the amplifier (222) is dependent on an input from the modulation/power controller (202) dependent on the type of modulation applied to the signal being amplified. The level of power to be applied to a signal output from the CPE transmit path at any time will be set by the CPE processor (204) and input into the amplifier (222) via the controller (202).

Figure 13:
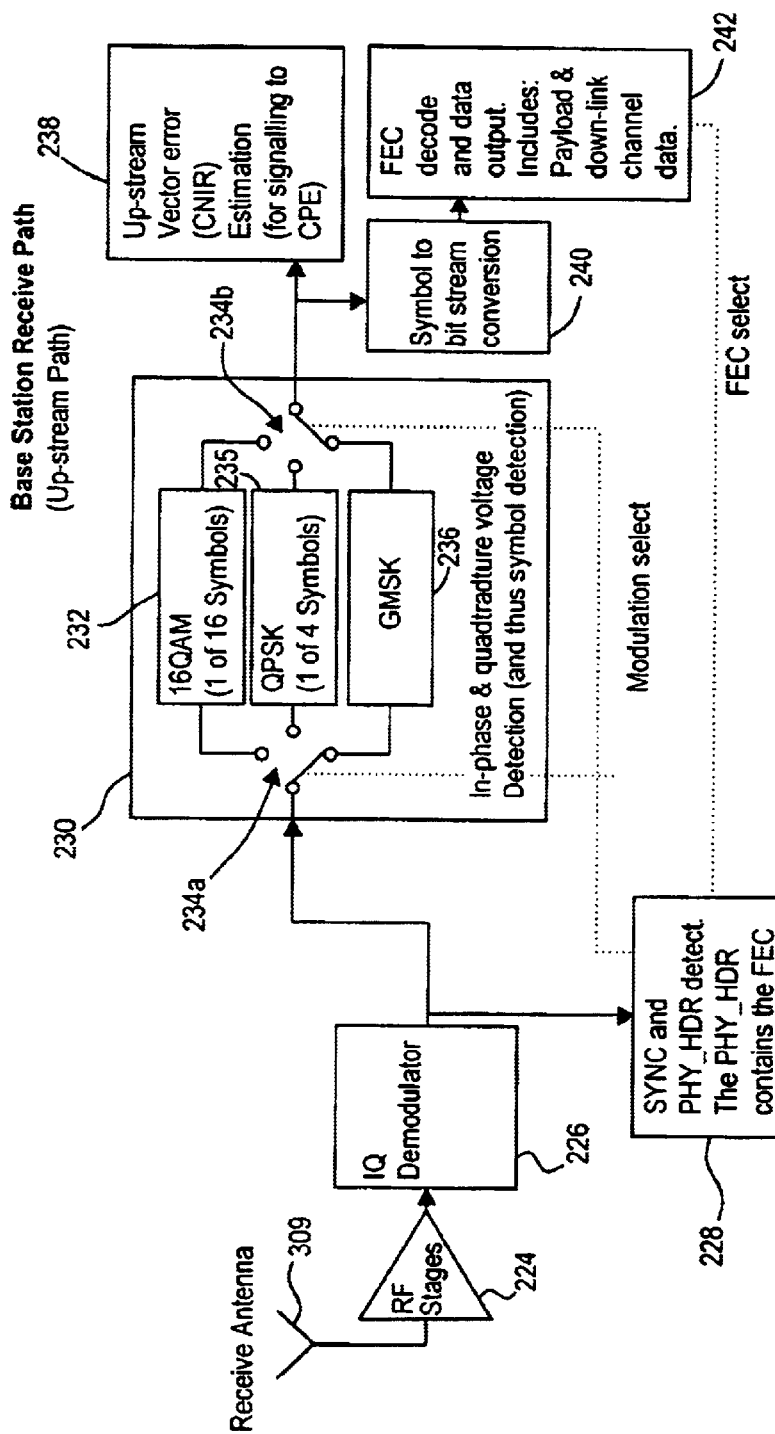
FIG. 13 shows the configuration of a base station receive path according to the present invention.

FIG. 13 shows the base station receive path. The base station receives signals transmitted over the uplink via the antenna (309) and the received signal is downconverted in the rf stages (224) and demodulated in IQ demodulator (226). The output from the demodulator is input into a header information recovery means (228), which detects default modulation IQ signals and recovers the header information, for example by applying correlation coding. The header information will include the modulation scheme and FEC coding level required to recover the data in the payload associated with the header. The output of the demodulator is also input into an IQ signal detection block (230). The recovery means (228) recovers the modulation scheme associated with the incoming payload and actuates switching means (234a,234b) to switch the data output from the IQ modulator through the correct arm of the IQ signal detection block. The arm (232) is arranged to detect IQ signals sent using a 16-QAM modulation scheme, the arm (235) is arranged to detect IQ signals sent using a QPSK modulation scheme and the arm (236) is arranged to detect IQ signals using a GMSK modulation scheme. The arms (232) and (235) include filter means, such as FIR matched pulse shaping filters.

For example where a physical payload sent using a GMSK modulation scheme is received and demodulated the recovery means (228) detects this and switches the switching means (234a,234b) to the position shown in FIG. 11, so that the payload is passed through the arm (236) of the 10 signal detection block (230). Where a physical payload sent using a QPSK modulation scheme is received and demodulated the recovery means (228) detects this and switches the switching means (234a,234b) so that the payload is passed through the arm (235) of the IQ signal detection block (230). Where a physical payload sent using a 16-QAM modulation scheme is received and demodulated the recovery means (228) detects this and switches the switching means (234a, 234b) so that the payload is passed through the arm (232) of the IQ signal detection block (230).

The output from the IQ signal detection block (230) is input into a vector error detection means (238). This measures the quality of the uplink and then passes this information into the base station return path for transmission back to the relevant CPE for use by the CPE processor (204).

The output from the IQ signal detection block is also passed to the symbol to bit conversion means (240). The data block output from the means (240) is decoded in decoding means (242) using the FEC coding level for that data block which is input from the recovery means (228).

Figure 8:
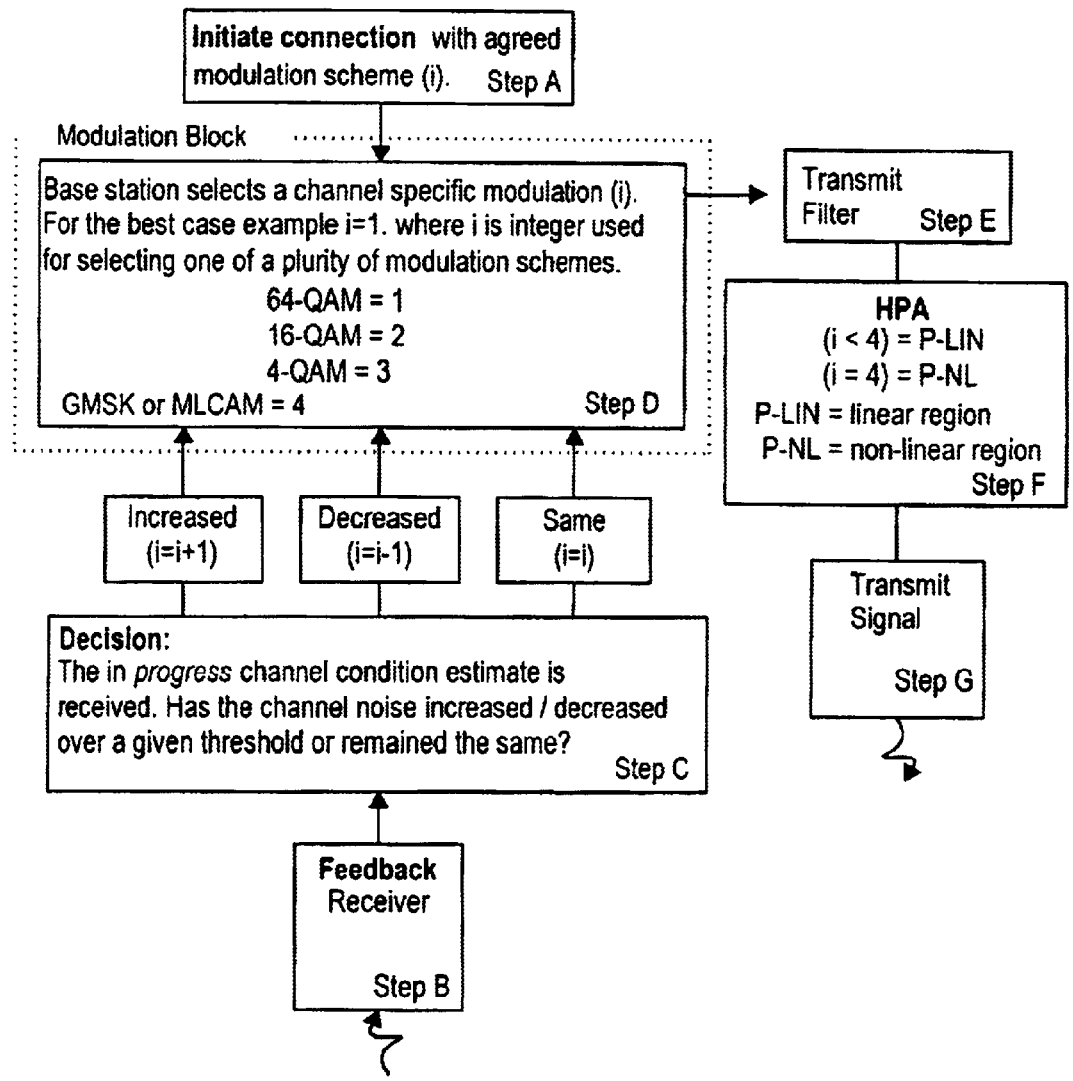
FIG. 8 is a flow chart schematically representing the steps in applying modulation adaptively according to the present invention.

FIG. 8 shows the method by which the base station (301) decides which level of modulation to allocate to a block (STEPS iv and v of FIG. 4). The call between the base station and the CPE is initiated with an agreed modulation scheme, depending on the distance between the CPE and the base station in accordance with FIG. 3 (STEP A). Each type of modulation is allocated an integer value of i, where i=1 to 4 as set out in STEP D of FIG. 8, as follows:

64-QAM–i=1

16-QAM–i=2

4QAM–i=3

GMSK or MLCAM–i=4

Thus, the output of STEP A is a value of i which is input into STEP D.

If the call is initiated by the base station then when the call is responded to by the CPE, the signal from the CPE is analysed to determine the status of the transmission link between the CPE and the base station (STEP B). If the call is initiated by the CPE then the call request signal from the CPE can be analysed to determine the status of the transmission link between the CPE and the base station (STEP B). Depending on the status of the transmission link as determined at STEP B, the increase or decrease in noise over the transmission link is determined to see whether this noise level has passed a pre-determined threshold (STEP C). If the noise has increased the output of STEP C is an indication that i=i+1, which input overrides any previous input from STEP A or STEP C, unless i=4, in which case the previous input from STEP A or STEP C remains valid. If the noise is unchanged the output of STEP C is an indication that i=i. If the noise has decreased the output of STEP C is an indication that i=i−1, which input overrides any previous input from STEP A or STEP C, unless i=1, in which case the previous input from STEP A or STEP C remains valid. At STEP D the block of information is allocated a modulation scheme dependent of the value of i last input into it in accordance with the system described above.

In the transmission STEP vii of FIG. 4, the signal header is modulated (STEP D of FIG. 10) using a default modulation scheme and the signal payload is modulated in accordance with the value of i allocated to it. The output from the modulator is the filtered as shown in FIG. 10 (STEP E) and then passed to a high power amplifier. For outputs from the modulators for which i<4 the power amplifier is operated in its linear region. For outputs from the modulators for which i=4, the power amplifier is operated in its non-linear region (STEP F). The amplified signal is then transmitted (STEP G).

Figure 1:
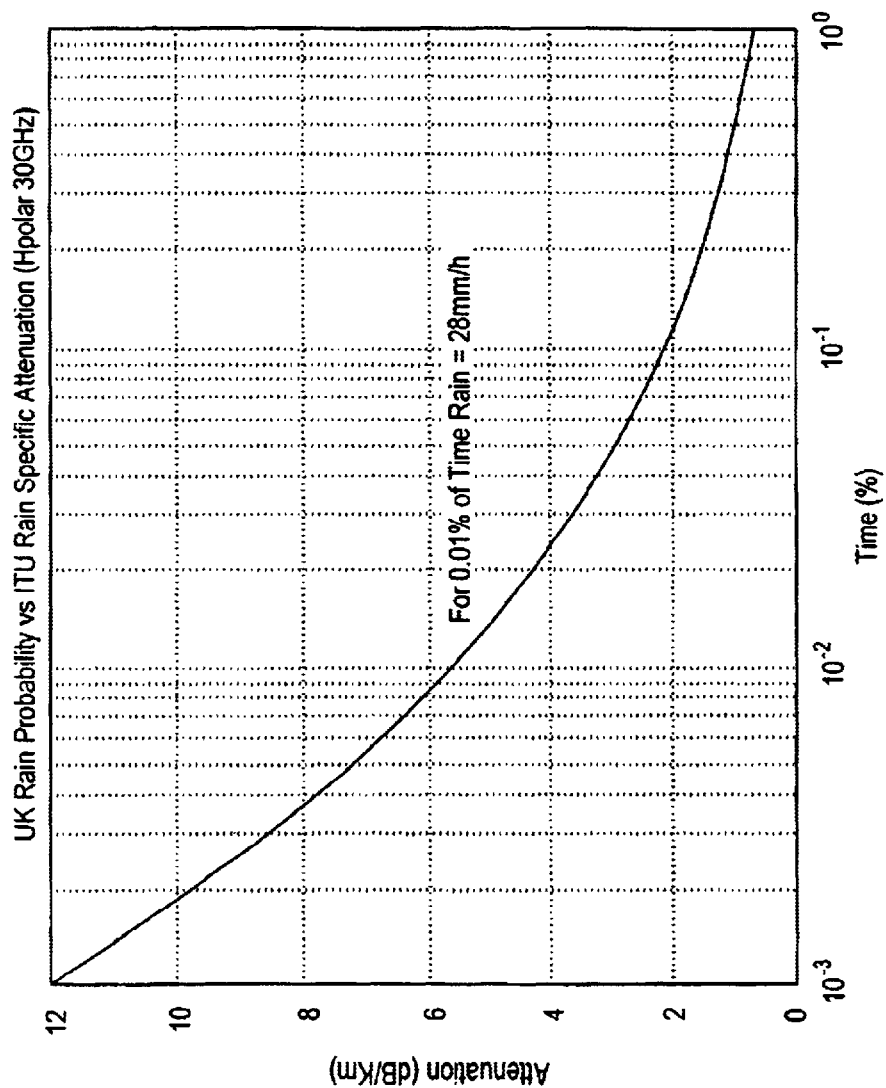
FIG. 1 is a graph which shows the level of attenuation to a 30 GHz signal due to rain levels against the probability of such rain levels occurring in UK climate zone 'F'.

For example, where a call is initiated from a base station to a CPE in the outer region (324) of FIG. 1, it is initiated using a default GMSK or MLCAM modulation scheme and non-linear amplification and so a value of i=4 is allocated (STEP A). Based on the i=4 allocation from step A, GMSK or MLCAM modulation is applied to the data making up the call in accordance with the integer level i=4 (STEP D). The modulated signal is filtered (STEP E) and passed to the high power amplifier (STEP F) where it is amplified non-linearly in accordance with its allocated i=4 integer level before transmission to the CPE. When a response is received from the CPE the response will include feedback information about the quality of the downlink to the CPE. If the quality of the downlink is above a certain threshold level then the transmission link may be allocated an integer level i=3 (STEP C). Based on the i=3 allocation from step C, QPSK modulation is applied to the data making up the next burst of the call according to the integer level i=3 (STEP D). The output of the modulation block is filtered (STEP E) and passed to the high power amplifier (STEP F) where it is amplified linearly in accordance with its allocated i=3 integer level before transmission to the CPE. The data making up the remainder of the call will be allocated an integer level i=3, unless the quality of the link changes further. If the quality of the link changes further the allocated integer i will change again. For example if the link deteriorates an integer level i=4 may be allocated and if the link improves an integer level i=2 may be allocated.

As an alternative to the arrangements shown in FIGS. 10 to 13, different modulators and demodulators could be used for the GMSK signals and the QAM signals.

What is claimed is:

1. A cellular radio communication system for transmitting data over a plurality of transmission links comprising:
   a generator for producing a modulated signal by applying a modulation scheme to data to be transmitted across a transmission link;
   an amplifier having a non-linear mode of amplification and a linear mode of amplification; and
   a processor for determining the quality of said transmission link,
   wherein a constant envelope modulation scheme and said non-linear mode of amplification is used for transmitting said data when said quality determination falls below a threshold, and
   a second modulation scheme and said linear mode of amplification is used for transmitting said data when said quality determination exceeds said threshold.

2. A cellular radio communication system according to claim 1 wherein said second modulation scheme is an amplitude dependent envelope modulation scheme.

3. A cellular radio communication system according to claim 1 wherein the constant envelope modulation scheme is GMSK.

4. A cellular radio communication system according to claim 1 wherein the constant envelope modulation scheme is Multiple Level Continuous Amplitude Modulation (MLCAM).

5. A cellular radio communication system according to claim 1 wherein said second modulation scheme is one of a Quadrature Phase Shift Keying (QPSK) modulation scheme, a 16-QAM (Quadrature Amplitude Modulation) modulation scheme and a 64-QAM (Quadrature Amplitude Modulation) modulation scheme, depending on the quality determination.

6. A cellular radio communication system according to claim 1, wherein additionally forward error correction coding is used for transmitting said data when said quality determination exceeds said threshold.

7. A cellular radio communication system according to claim 1 wherein said processor additionally selects said second modulation schemes depending on the quality determination.

8. A cellular radio communication system according to claim 1 wherein each transmission link is allocated a default modulation scheme for use when a call is initiated and which default modulation scheme is the highest spectral efficiency modulation scheme which will deliver a predetermined bit error rate in poor environmental conditions.

9. A cellular radio communication system according to claim 1 wherein the transmission links comprise a point to multi-point link.

10. A cellular radio communication system according to claim 1 wherein the system is a wireless access system.

11. A transmitting unit for a cellular radio communication system for transmitting data over at least one transmission link comprising:
    a generator for producing a modulated signal by applying a modulation scheme to data to be transmitted across a transmission link;
    an amplifier having a non-linear mode of amplification and a linear mode of amplification; and
    an input for receiving a quality determination for said link;
    wherein a constant envelope modulation scheme and said non-linear mode of amplification is used for transmitting said data when said quality determination falls below a threshold, and
    a second modulation scheme and said linear mode of amplification is used for transmitting said data when said quality determination exceeds said threshold.

12. A transmitting unit according to claim 11 comprising means for initiating a call over a transmission link by using a default modulation scheme, which default modulation scheme is the highest spectral efficiency modulation scheme which will deliver a predetermined bit error rate in poor environmental conditions on the transmission link.

13. A transmitting unit according to claim 11 wherein the constant envelope modulation scheme is GMSK.

14. A transmitting unit according to claim 11 wherein the constant envelope modulation scheme is Multiple Level Continuous Amplitude Modulation (MLCAM).

15. A transmitting unit according to claim 11 wherein the second modulation scheme is one of a Quadrature Phase Shift Keying (QPSK) modulation scheme, a 16-QAM (Quadrature Amplitude Modulation) modulation scheme and a 64-QAM (Quadrature Amplitude Modulation) modulation scheme depending on the quality determination.

16. A transmitting unit according to claim 11 wherein the generator applies a level of forward error correction coding to the data to be transmitted when the quality determination exceeds said threshold.

17. A transmitting unit according to claim 11 wherein the transmission links comprises a point to multi-point link.

18. A transmitting unit according to claim 11 wherein the system is a wireless access system.

19. A transmitting unit according to claim 11 for transmitting signals over a transmission link to a receiving unit, further comprising a selector, wherein said selector selects a modulation scheme for the transmission link depending on the received quality determination.

20. A method of operating a cellular radio communication system for transmitting data over a plurality of transmission links comprising the steps of:
    determining the quality of a transmission link;
    selecting a modulation scheme and an amplification mode according to said determination;
    generating a modulated signal by applying said modulation scheme to data to be transmitted across said transmission links; and
    amplifying the modulated signal using said selected mode of an amplifier having a non-linear mode of amplification and a linear mode of amplification, wherein a constant envelope modulation scheme and said non-linear mode of amplification is selected when said quality determination falls below a threshold, and a second modulation scheme and said linear mode of amplification is selected when said quality determination exceeds said threshold.

21. A method according to claim 20 wherein the constant envelope modulation scheme is GMSK.

22. A method according to claim 20 wherein the constant envelope modulation scheme is Multiple Level Continuous Amplitude Modulation (MLCAM).

23. A method according to claim 20 wherein the second modulation scheme is selected from one of:

a Quadrature Phase Shift Keying (QPSK) modulation scheme, a 16-QAM (Quadrature Amplitude Modulation) modulation scheme and a 64-QAM (Quadrature Amplitude Modulation) modulation scheme depending on the quality determination.

24. A method according to claim 20 additionally comprising the steps of:

applying a level of forward error correction coding when said quality determination exceeds said threshold.

25. A method according to claim 20 additionally comprising the step of:

allocating each transmission link a default modulation scheme for use when a call is initiated, which default modulation scheme is the highest spectral efficiency modulation scheme which will deliver a predetermined bit error rate in poor environmental conditions.

26. A method according to claim 20 wherein the transmission links comprise a point to multi-point link.

27. A method according to claim 20 wherein the system is a wireless access system.

* * * * *